United States Patent Office 2,954,385
Patented Sept. 27, 1960

2,954,385
PRODUCTION OF MALEIC AND PHTHALIC ANHYDRIDES

Donald E. Burney, Hammond, and Melvern C. Hoff, Highland, Ind., assignors to Standard Oil Company, Chicago, Ill., a corporation of Indiana No Drawing. Filed Oct. 2, 1957, Ser. No. 687,621

10 Claims. (Cl. 260—346.4)

This invention relates to the oxidation of aromatic compounds and more particularly is concerned with an improved catalyst system for the vapor phase oxidation of aromatic compounds to products such as phthalic and maleic anhydrides.

Many processes are well known whereby aromatic compounds may be oxidized to commercially valuable products by a vapor phase reaction with oxygen in the presence of metallic oxide oxidation catalysts. Typical of such processes are the oxidation of benzene to maleic anhydride and the oxidations of orthoxylene or naphthalene to phthalic anhydride. In commercial vapor phase oxidation processes a mixture of an oxygen-containing gas such as air, together with vapors of the aromatic feedstock are reacted at high temperatures in the presence of an oxidation catalyst which is usually an oxide of one or more of the group Vb or group VIb metals of the periodic table of elements, commonly vanadium or molybdenum. Depending upon the nature of the aromatic feedstock, the catalyst employed, and the product desired, reaction conditions are selected within a temperature range of about 250 to 600° C., catalyst contact times of between about 0.01 to 5.0 seconds, pressures from ½ to about 10 atmospheres absolute, and molar ratios of air to aromatic between about 5:1 and 300:1. Vapor phase oxidations have been successfully practiced commercially, and in the case of naphthalene oxidation, yields of up to 80 weight percent (the theoretical weight yield is 115%) of phthalic anhydride have been reported.

However, in catalytic vapor phase oxidations it has been found that notwithstanding the use of an active catalyst it is necessary to exercise the most rigid control over catalytic reaction conditions—particularly the catalyst bed temperature and contact time—in order to obtain oxidation of the aromatic feedstock to the desired product without over-oxidation ultimately to carbon dioxide and water. The problem arises because existing catalysts lack sufficient selectivity to direct the oxidation to the preparation of the desired product while blocking over-oxidation to carbon dioxide. Thus it has been necessary to select precisely an optimum reaction temperature. Notwithstanding the employment of elaborate and expensive reactor vessel designs and the maintenance of stringent control over process variables, yields from commercial vapor phase operations are nonetheless short of being completely satisfactory.

Accordingly, it is an object of the present invention to improve the yields from processes for the oxidation of aromatic compounds to commercially valuable products by improving the selectivity of the catalyst system, and accordingly reduce the amount of product lost by over-oxidation. Yet another object is to facilitate the practice of commercial oxidations by reducing the exothermic heat of oxidation. Other and related objects will become more apparent as the description of this invention proceeds.

The objects of this invention may be attained in convenient manner by conducting catalytic vapor phase aromatic oxidation processes in the conjoint presence of a metal oxide oxidation catalyst and a volatile metal-free bromine-containing compound. It has recently been discovered in connection with the liquid-phase air oxidation of aromatics that bromine (or bromine compounds) exerts a threefold effects on the selectivity of metal oxidation catalysts. Firstly, bromine promotes the rate of initial oxidative attack of the aromatic compound, especially at the location of aliphatic side chains or alicyclic rings (which appear to react similarly to aliphatic side chains), to produce aromatic acids or anhydrides. This effect is particularly notable in the oxidation of dialkylbenzenes, where bromine permits the employment of less severe oxidation conditions. Secondly, the stability of the aromatic acid product is secured, leading to much higher yields than with conventional non-bromine-promoted catalyst systems. Thirdly, there is a definite suppression of the formation of carbon dioxide. These benefits combine to give a highly desirable improvement in yields from oxidation processes. In certain respects vapor phase processes are even more subject to improvement than liquid phase oxidations, since the former permit the oxidation of aromatic rings (such as benzene to maleic anhydride and naphthalene to phthalic anhydride) while the latter do not. The oxidation of aromatic rings is inherently a high-severity operation, in which there is a more critical requirement that the catalyst possess high selectivity in order to prevent the by-production of carbon dioxide.

In vapor phase oxidations, the obvious benefits in employing a more selective catalyst system to attain a higher product yield with lower loss to carbon dioxide give, in addition, marked advantages from the standpoint of controlling oxidations in commercial plants. This may be illustrated with reference to naphthalene, where the theoretical exothermic heat of oxidation to phthalic anhydride is only 3330 calories per kilogram of naphthalene, yet because of some degree of over oxidation to maleic anhydride and some complete combustion to carbon dioxide the observed heat liberated is from 5500 to 6000 calories. This large exothermic heat of reaction necessitates the employment of elaborate heat-dissipating equipment to avoid the formation of hot spots in the catalyst bed and to prevent burning of the feedstock or product to carbon dioxide, with resulting localized "hot spots" and sintering of the catalyst. To remove heat of reaction and prevent catalyst hot spots, it is the practice to either employ a fluidized catalyst bed, to place the catalyst in thin-walled small diameter metal tubes surrounded by boiling or molten heat-exchange media, or to dispose the catalyst in the form of thin adiabatic layers, and provide a large excess of combustion air so as to reduce the temperature rise by virtue of its sensible heat capacity. By providing a more selective catalyst system, the extent of oxidation to $CO_2$ is minimized, which correspondingly lowers the actual heat of reaction and thus reduces the problem of temperature control of the catalyst bed. With some catalysts, it may also be possible to take advantage of improved catalyst selectivity and reduce the reaction temperature somewhat, thereby further minimizing the product lost by over-oxidation. And in existing plants the feed rate may be increased, since the burden heretofore imposed on heat-removal equipment would be substantially reduced.

Halogens have previously been suggested for use in aromatic oxidation processes. One such attempt employed volatile vanadium oxyhalides (particularly the oxychlorides) as homogeneous oxidation catalysts. In such systems the volatile catalyst, air and hydrocarbon vapor were passed at high temperatures through one or more tubes containing porous filler material such as pumice or brick. However, with this technique it is probable that the volatile catalyst decomposed to vanadium oxide and halogen, with the oxide depositing on the filler at the inlet of the tubes and thereafter acting as an unpromoted catalyst, while the halogen was carried out of the reaction zone with the oxidation products (Marek and Hahn, "Catalytic Oxidation of Organic Compounds in the Vapor Phase," p. 419). Patents such as Jaeger U.S. 1,848,723 proposed regenerating spent oxidation catalysts with a halogen-air stream after discontinuing aromatic flow. Others have used large amounts of hydrobromic acid as catalysts in the absence of metal oxide catalysts.

In contrast to the above, in the practice of this invention the continuous or substantially-continuous introduction of a small quantity of a volatile metal-free bromine compound during the oxidation is employed to enhance the activity and selectivity of conventional solid metal oxide type catalysts. The desirable addition rate is less than about 5 gram atoms of bromine per 100 mols of aromatic feed, and is preferably less than about 2 gram atoms, for example 0.5. Even smaller quantities down to a few parts per million can be used. Small quantities of bromine compounds do not lead to the volatilization of excessive amounts of metal oxide oxidation catalysts, particularly where the oxidation temperature is maintained above about 300° C., and accordingly should not deleteriously affect catalyst life. By permitting the use of lower reaction temperatures and by reducing the likelihood of hot spots in the catalyst bed, catalyst life may actually be increased. Where low reaction temperatures or large quantities of bromine are used, molybdenum catalysts rather than vanadium catalysts may be used as they are more able to resist volatilization.

A wide variety of aromatic compounds are capable of oxidation to commercially valuable products under the conditions of this invention. The mononuclear aromatic benzene is converted to maleic anhydride in excellent yields. Mononuclear aromatics having ortho-oriented alkyl groups as exemplified by orthoxylene, ortho-ethyltoluene, ortho-ethyl-cumene and ortho-diisopropylbenzene are oxidized to phthalic anhydride, while pseudocumene is converted to trimellitic anhydride, durene (1,2,4,5-tetramethyl benzene) to pyromellitic anhydride and prehnitene (1,2,3,4-tetramethyl benzene) to mellophanic anhydride. Para and meta-substituted dialkyl benzenes such as paraxylene, paracymene, metadiisopropyl benzene, and metaxylene are oxidized to a mixture of maleic anhydride, benzoic acid, and toluic acid, together with the unstable and rarely-isolated terephthalic or isophthalic acids. Naphthalene, methylnaphthalene, and dimethylnaphthalene are oxidized to phthalic anhydride, while anthracene forms anthraquinone and phthalic anhydride, and phenanthracene oxidation produces a mixture of phenanthraquinone, diphenic acid anhydride and phthalic anhydride. Diphenyl and most alkyl-diphenyls are converted to maleic anhydride. Aromatic-alicyclic ring compounds as indene, indane, 1,4-dihydronaphthalene, and tetralin, all of which have five or six-membered alicyclic rings connected to adjacent carbon atoms on an aromatic ring, are readily converted to phthalic anhydride. Since phthalic anhydride is many times more stable than meta or para aromatic dicarboxylic acids, a convenient system for obtaining pure phthalic anhydride is the high-severity oxidation of a mixture of isomeric xylenes whereby only the orthoxylene reaction product (phthalic anhydride) survives. Also included among the aromatic compounds oxidizable to dicarboxylic acid anhydrides and therefore within the scope and spirit of this invention are lower oxidation products of aromatic hydrocarbons such as phenol, cresol, benzoquinone, benzaldehyde, o-tolualdehyde, cinnamic acid, naphthaquinone, and α- and β-naphthol. Petroleum fractions afford a convenient source of aromatic and aromatic-alicyclic ring compounds, while a mixture of naphthalene, methyl naphthalenes and dimethyl naphthalenes is obtained as the bottoms from petroleum catalytic hydroformates. Cycle oils derived from thermal or catalytic cracking operations are rich in fused ring aromatics, and impure coal tar distillates contain large quantities of utilizable aromatic compounds. By the careful choice of low reaction temperatures and the selection of particular known catalyst compositions, such lower-oxidation products as quinones, naphthols, phenols, benzoic acid, and aromatic alcohols and ketones may be obtained by the controlled oxidation of aromatic compounds.

In vapor phase oxidation systems with or without bromine, aromatics which are not ortho-substituted, as meta and para di-alkyl benzenes, are converted to isophthalic and terephthalic acids respectively. These acids however normally lack sufficient stability to resist further oxidation and cleavage of the benzene ring. Thus, as soon as any isophthalic or terephthalic acid forms, the benzenoid ring tends to rupture yielding maleic anhydride. Consequently, unless the reaction is conducted at very low temperatures, for example between 100 and 350° C., and in the presence of from 0.1 to 10 mols of steam per mol of feed to stabilize the benzene ring, little or no isophthalic or terephthalic acid is obtained. Steam may also be formed in situ, as by the oxidation of p-ethyltoluene, p-diisopropylbenzene or p-diisobutylbenzene. However, in the case of ortho-substituted aromatics, vapor phase oxidation leads to phthalic anhydride rather than orthophthalic acid, and the new double ring structure offers considerable resistance to rupture. As an indication of the stability of phthalic anhydride, catalyst contact times on the order of four times those used to oxidize naphthalene to phthalic anhydride are needed to convert phthalic anhydride to maleic anhydride.

Oxidation catalysts which are employed for oxidations in the presence of bromine compounds according to the process of the instant invention are conveniently those which heretofore have been used without bromine promotion, and are primarily oxides of one or more metals in groups Vb and VIb of the periodic table of elements as defined in Deming's General Chemistry, 5th Ed. (Wiley). Vanadium and molybdenum oxides, the first-discovered aromatic oxidation catalysts, are still the catalysts of choice, although chromium, nickel, tungsten and uranium oxides, among others, are effective. The oxidation catalysts are oxides of metals having more than one oxidation state and hence capable of reacting with molecular oxygen in ascending from their lower valent states and releasing active atomic oxygen while descending from their superior oxidized forms. Vanadium, for example is continually in transition between its pentavalent, tetravalent and trivalent states in a high temperature oxygen-containing atmosphere. Mixtures of metal oxides, as vanadium-molybdenum, tin-vanadium, iron-chromium, chromium-vanadium, etc. are exemplary of catalyst formulations which have been found notable for particular aromatic oxidation reactions. It is possible that an actual compound is formed between two or more metals or oxides but these may for convenience be referred to and considered as metal oxides. Auxiliary compounds in admixture with the primary metal-oxide catalyst have been used to promote or inhibit certain stages of oxidation. Included among such auxiliary compounds are oxides and salts of phosphorous, aluminum, titanium, iron, cobalt, zinc, copper, nickel, magnesium, manganese, silver, antimony and bismuth. Usually the catalyst will include only a minor amount of the auxiliary compound, for example from 2 to 20% based on the total catalytic metal present, and preferably less than 15%.

To provide a catalyst having a large surface area, the catalytic metal oxide is usually deposited on an inert carrier. Inert carriers are not essential as, in the case of vanadium pentoxide, a fused solid vanadium pentoxide catalyst or a catalyst consisting merely of pellets of vanadium metal oxidized in situ possesses excellent activity. Among the carriers found useful as supports for oxidation catalysts are zeolites, asbestos, pumice, quartz, quartz fused with Pyrex glass, aluminum, Alundum, aluminum metal, corundum, kieselguhr, and silica gel or silica gel poisoned by potassium sulfate. While sodium or potassium silicate glasses have been proposed catalyst carriers for the oxidation of benzene to maleic anhydride, it is now known that basic materials are injurious to catalyst selectivity and consequently a neutral or acidic carrier is generally preferred. For ring-rupturing oxidations as those of benzene, naphthalene, phenanthrene, etc., a porous carrier generally gives superior results while for the oxidation of alkyl or alicyclic side chains, as in the conversion of orthoxylene or indane to phthalic anhydride, a non-porous carrier such as silicon carbide is usually more effective. The term "non-porous carrier" is herein used to designate those materials in which the catalytically active oxides are deposited essentially on the outer surface portion of the carrier, and catalytic action takes place on the outer surface region rather than in the deeper interior portion of the carrier. Carrier porosity is but one variable in an aromatic oxidation process and the relationship between porosity and feedstock may be alternated if necessary to provide an optimum operation. In most instances, a catalyst effective for the oxidation of one aromatic compound will suffice for the oxidation of others, although perhaps at somewhat reduced yields.

Where the catalyst is to be deposited on an inert carrier, the metal oxide may be added by any of the common manufacturing methods. Included among these methods are precipitation from a colloidal dispersion of the catalyst metal in an inert liquid, coprecipitation of the catalyst and carrier, impregnation of the carrier with a slurry or solution containing a catalyst salt such as ammonium metavanadate, impregnation of the carrier with a molten catalytic metal, thermal decomposition of a volatile metal compound, dusting, and spraying. In fixed beds the carrier is in the form of discrete particles preferably of from 3 to 6 mesh size, in the shape of pills, pellets, cylinders, beads, extrudates, granules, or the like. In fluidized-bed reactors the catalyst carrier is finely divided powder or microspheres, having particle sizes between about 10 and 100 microns.

Improved conversions may be attained by pretreating the catalyst before use to deposit bromine thereon, particularly when an alumina carrier is employed. This is an adjunct to continuous bromine addition during oxidation. Pretreating may be accomplished by passing a vaporized bromine compound over the carrier alone or over the catalyst at oxidation temperatures or by impregnating the catalyst or carrier with a bromine compound during manufacture, with optional calcination to stabilize the bromine and/or oxidize the metal compound to the oxide. Ammonium bromide or hydrobromic acid is convenient for either type of pretreatment.

The nature of the bromine compound does not appear to be critical, provided it is sufficiently volatile at the reaction temperatures to allow for convenience of addition to and distribution in the catalyst mass and is free from metallic constituents which may decompose and form localized high concentrations of catalytic metals at the inlet to the catalyst bed. Liquid bromine-containing compounds are of course preferred from the standpoint of convenience in handling, but gases or volatile solids may be used. Elemental bromine and hydrobromic acid are included within the definition of "bromine compounds" as employed herein. Illustrative or other suitable bromine compounds include aliphatic compounds as methylene bromide, bromoform, carbon tetrabromide, ethylene bromide, ethylidene bromide, dibromo ethylene, and tetramethylene bromide. Aromatic bromine compounds such as bromobenzene, and brominated oxygen derivatives of aromatics may also be employed. Ammonium bromide is a useable low-cost volatile solid. Bromine compounds apparently dissociate at the high temperature oxidation conditions existing in the reaction zone and provide a bromine atmosphere which activates the metal oxide catalyst for selective oxidation of aromatics. As previously indicated, it is desirable to add the bromine compound continuously at a small measured rate to the aromatic-air stream entering the reaction zone, although periodic intermittent addition may be employed. Bromine compounds containing metallic constituents, typified by vanadium oxy-dibromide, vanadium oxy-tribromide, and molybdenum tetrabromide, are undesirable as they decompose to a solid metal oxide which forms a localized highly-active catalyst deposit on preheater tubes or at the inlet to the catalyst bed.

The bromine promoter may be added to the reaction zone using techniques depending upon the nature of the aromatic feedstock and the form in which bromine is available. With normally-liquid aromatics and aromatic-soluble bromine compounds the bromine may be added in the proper amount to a storage tank containing the liquid feed, and the mixture then vaporized. With solid aromatics as naphthalene the bromine compound is preferably metered as a vapor or atomized liquid into an air stream or an air-aromatic stream. If the bromine compound is available as a gaseous material, e.g. hot elemental bromine or anhydrous HBr, it may be introduced as such into either the air, the vaporized aromatic, or the air-aromatic stream. Solid bromine compounds are advantageously dissolved in an inert solvent and the solution atomized into a hot gas stream. Liquid bromine compounds afford the most flexibility as they may be mixed with a liquid aromatic feed, vaporized independently, and added to a gas stream, or sprayed as a liquid into a gas stream.

In certain cases it may be desirable to employ several reactors, or several catalyst beds and add bromine between beds to suppress over-oxidation in the latter stages of oxidation. Thus, benzene may be partially oxidized in the absence of bromine to benzoquinone over a first bed consisting of a catalyst on a basic carrier while a bromine compound is added before passage over a second bed employing a neutral carrier to complete the oxidation to maleic anhydride. By this procedure the basic carrier is used to facilitate the initial attack of the benzene ring while bromine-promoted catalysts on a neutral carrier complete the controlled oxidation to maleic anhydride. This technique may also be employed with ortho di-alkylbenzenes where there is more than one carbon atom in each alkyl group and controlled oxidation is important in the latter stages.

The operating conditions which give optimum yields for the bromine-activated catalytic oxidation of a particular aromatic feedstock with a given catalyst vary widely for the different catalyst and carriers and are best determined on an ad hoc basis for each feed-catalyst-carrier combination by experimentally varying the catalyst temperature and/or contact time. The difficulty in predicting an optimum severity level for each individual feed-catalyst-carrier combination is illustrated by data relating to the oxidation of naphthalene using a vanadium oxide catalyst in the absence of bromine, where the only variable was the nature of the carrier; vanadium oxide on a corundum carrier gave its optimum yield at 450° C., but with the catalyst on an inert wire screen, best results were obtained at 550° C. (Welty, U.S. Patent 2,485,342). By improving the catalyst's selectivity, bromine addition may afford somewhat more flexibility in the choice of operating temperatures and contact times, and accordingly permit lower temperatures and longer contact times in some instances. Therefore, the reaction severities recommended below are desirable and operable, but not necessarily optimum nor exclusive. In each instance, bromine is added at a rate of less than about 5 gram atoms per 100 mols of aromatic feed.

For the oxidation of benzene to maleic anhydride, temperatures on the order of 300 to 450° C. and preferably 300 to 400° C. or lower are desirable with a vanadium oxide catalyst, and somewhat higher temperatures, i.e. 350 to 530° C., for example 425–475° C., are preferred with molybdenum oxide. Contact times of between about 0.05 to 0.4 second, preferably about 0.1 second, are desirable, with an air rate of between 10 and 150 mols of air per mol of benzene.

The oxidation of naphthalene to phthalic anhydride requires somewhat more severe conditions, preferably temperatures between 375 to 600° C., and optimally 450 to 550° C., with vanadium oxide, and about 50° C. higher when the catalyst is molybdenum oxide. In either case the pressure is between ½ to 10 atmospheres, and the air rate between 10 and 300 mols per mol of feed.

Aromatics containing 3 or more fused rings may be oxidized either to a quinone or, at higher temperatures, to phthalic or other intramolecular anhydrides. For the oxidation of anthracene to anthraquinone with bromine-promoted oxides of chromium, molybdenum, tungsten or uranium, effective temperatures are between 250 to 650° C., preferably about 300 to 400° C. At higher temperatures within these ranges the yield of anthraquinone is decreased but more phthalic anhydride is produced. Phenanthrene at similar temperatures yields a mixture of phenanthraquinone and diphenic, maleic, and phthalic anhydrides.

For the vapor phase oxidation of orthoxylene, as typical of the ortho alkyl benzenes, bromine-promoted vanadium oxide catalysts require temperatures of between about 350 and 525° C. or lower. Where the catalyst is bromine-promoted molybdenum oxide, temperatures in the range of 400 to 550° C. are desired. Contact times for either catalyst are on the order of about 0.01 to 1.0 second. To provide sufficient oxygen for the oxidation, to control the reaction temperature rise by means of its latent heat content, and to disperse the reactants so as to prevent thermal polymerization, the molar ratio of air to orthoxylene is at least about 10:1 and preferably more than 50:1 and up to 300:1. Higher air-to-hydrocarbon ratios, however, require more air blower capacity and a larger capacity product recovery system for obtaining phthalic anhydride from the reacted gas stream.

Various types of reactors may be employed to carry out the oxidation of aromatic compounds. The suitable reactors are designed to provide intimate contact between the reacting gases and the catalyst, while being adapted for removing the large quantities of heat released during oxidation and for maintaining a controlled and small temperature rise through the catalyst bed. The earliest and still most commonly used reactors are of the Downs-type fixed bed design similar to those described in Downs Patent 1,374,721, wherein the catalyst on a suitable inert carrier is contained within long thin tubes immersed in a bath of a boiling liquid. Some recent installations employ fluidized beds as described in Becker Patent 2,373,008 and remove heat from the bed by means of steam-generating coils immersed in the dense phase. Other reactor arrangements which are able to control the temperature within a range of about plus or minus 25° C. and accordingly prevent hot spots and consequent overdecomposition of the product to carbon dioxide include the distribution of the catalyst in several thin adiabatic beds or by cyclic fluidized bed catalysis as described in Example III below.

Recovery of the oxidation products may be effected by any one or more of numerous different procedures. Phthalic anhydride is most conveniently crystallized as needles of the anhydride by cooling the reactor effluent gases, but maleic anhydride is too volatile even at 0° C. for such treatment alone. Either phthalic or maleic may be recovered in the form of the acids by water scrubbing at 60–90° C. with subsequent cooling of the fat liquor to about 20° C. to precipitate the acids, or by evaporating the water, or by the use of anion exchange resins. Other acids such as benzoic, diphenic, and the like may similarly be recovered by a water scrub. Aromatics such as benzene, xylenes, diphenyl, and methylnaphthalene are effective scrubbing agents for acidic products and are particularly desirable for recovering anhydrides since there is no hydration of anhydrides to acids. Alcohols are especially attractive scrubbing agents for maleic and phthalic anhydrides if it is desired to recover the anhydrides in the form of their esters; the addition of catalyst such as sulfuric acid or lead oxide facilitates formation of the esters which may then be crystallized from the alcohol and either marketed as such or hydrolyzed to the acid. Methanol, butanol, isooctanol, and 2-ethyl hexanol are suggested alcohols. Dibasic acid esters, most notably diesters of maleic or phthalic acid boiling at temperatures above the respective anhydride boiling points, may similarly be used for product recovery. Acid products may be scrubbed with basic materials such as aqueous caustic, tetramine bases, or pyridine derivatives, followed by precipitation by acidification. Methyl isobutyl ketone and dimethylformamide scrubbing have also been proposed. Scrubbing may be conducted either in a spray tower, in a packed tower, or in other equivalent equipment.

It is generally economical to recover and recycle the bromine after it leaves the reaction zone. To accomplish this, the reactor effluent gases are scrubbed with a solvent either concurrent with or following the product recovery. Little or no bromine is found in phthalic anhydride which is merely crystallized from a gas stream. The preferred solvents depend on the form in which most of the bromine is present in the reactor effluent, and this in turn is related to the oxidation conditions. For the recovery of elemental bromine, scrubbing with water or an organic compound such as an aromatic (most desirably a portion of the aromatic feed), alcohols, ethers, or halogenated organics as carbon tetrachloride is effective. Hydrobromic acid may be recovered with water or ketones which may also contain a basic compound such as ammonia. Organic bromides are removed with almost any non-aqueous solvent. The absorbed bromine compounds may be concentrated, e.g. by distillation, and recycled to the oxidation reactor. Bromine concentration is unnecessary if a portion of the aromatic feed is employed for scrubbing.

To more clearly understand the features of this invention, typical vapor phase catalytic oxidations of aromatic compounds are described hereinafter. In each example a different feed is oxidized in a different type of reactor but it will be understood that the physical equipment may be interchanged.

*Example I*

For the oxidation of naphthalene in a modified downflow Downs-type reactor, the necessary equipment may be grouped into three zones. In the first, or reactant make-up zone, the proportions of air to naphthalene and bromine compound are established. The second or reactor zone comprises the physical reactor assembly with its auxiliaries for removing the heat of reaction. In the third or product-recovery zone the reactor effluent is treated for the recovery of phthalic anhydride.

More specifically, a stream of primary air at a pressure of about 1.5 atmospheres is filtered and preheated to a suitable temperature, e.g. from 300 to 500° C. in an indirectly-heated furnace-type preheater. The quantity and the preheat temperature of the primary air are selected to vaporize the required amount of naphthalene in a naphthalene vaporizer to provide, with the secondary air, the proper ratio of air to hydrocarbon in the catalytic reactor. From the preheater, the primary air is fed through a distributor network to the bottom of a naphthalene vaporizer vessel, where it bubbles through a pool of molten naphthalene and vaporizes some of the naphthalene. Mixing is further assured by perforated baffles immersed in the molten liquid. After primary air containing naphthalene vapors leaves the naphthalene vaporizer, a volatile bromine compound, tetrabromoethane, is metered into the gas stream by a proportionating pump. The quantity of bromine is approximately ¼ mol of tetrabromoethane per 100 mols naphthalene. Secondary air in sufficient quantity to afford an air to naphthalene ratio of about 30:1 and a catalyst contact time of about 0.1–0.2 second is added to the primary air-naphthalene stream and the mixture conducted to the catalytic converter.

The catalytic converter is a Downs-type downflow reactor comprising an outer sealed shell with an internal construction resembling a vertical single-pass heat exchanger. Accordingly, there are tube sheets into which the respective ends of each catalyst-packed tube are sealed, permitting vapors to flow from the inlet downward through the catalyst-packed tubes and leave the reactor through an outlet connection in the bottom head. A vanadium oxide catalyst is distributed on a 6-mesh corundum support. The catalyst-containing tubes may vary substantially in shape and length, but are preferably square shaped to afford a large surface area for temperature control, about ⅝ of an inch inside width, and about 3 to 10 feet in length. The tubes may however be of square, circular, or finned-circular cross section, and between about ½ to 3 inches or more inside width and from 6 inches to 10 feet or more in length. Thermocouples embedded in the catalyst tubes measure the reaction temperatures therein, desirably at a plurality of points throughout the bed to indicate local temperatures. The catalyst-containing portion of the tubes is immersed in a bath of molten or boiling material, which may be either a low melting metal as mercury or mercury allowed with lead, cadmium and/or tin; sulfur; Dowtherm (diphenyl and diphenyl oxide); or a molten salt such as a eutectic of potassium nitrate and nitrite. Mercury is used for temperature control as its atmospheric boiling point of 357° C. is approximately the lowest useable temperature for the catalytic oxidation of naphthalene. Higher temperatures in a boiling mercury system are obtained by increasing the pressure in the shell side with nitrogen or carbon dioxide gas. Similarly, the boiling temperature is lowered by operating at subatmospheric pressures. Where temperatures above about 400° C. are desired, rather than regulate the temperature by increasing system pressure alone, which requires thicker reactor and tube walls, a higher-boiling mercury alloy may be employed as described above.

The bath of molten mercury removes heat of reaction from the catalyst bed and in so doing boils and is vaporized. The rising vapor heats the upper portion of the catalyst tubes and regulates the entering air-naphthalene feed temperature within a few degrees of the reaction temperature desired for the catalyst bed, i.e. about 450–500° C.

The mercury vapor is cooled and condensed in a condenser which comprises a plurality of interconnected thin walled tubes exposed to the air. Since the oxidation is highly exothermic, the air cooled condenser is large in size and may be substituted or complemented by a water or steam-cooled heat exchanger. The condensed mercury vapors are returned to the mercury bath by gravity. In lieu of a condenser, the mercury vapors may be employed to generate steam to power the air compressors or may be used in the preheater to preheat the primary air by indirect heat exchange.

Effluent gas from the catalytic converter then passes to the product recovery system. The product recovery system consists of a water-cooled pre-cooler and a "hay barn" condenser. The pre-cooler is an open water trough through which a single straight vapor line passes and wherein the temperature of the outlet gas stream is regulated by the rate and temperature of cooling water addition in order to cool the reactor effluent gas to a temperature between the phthalic anhydride frost point and the water dew point, e.g. 50–130° C. The phthalic anhydride frost point is defined as that temperature at which phthalic anhydride first begins to separate out of the gas as a solid phase, and the water dew point the temperature at which moisture first begins to condense as a liquid. Where there is no objection to the hydration of phthalic anhydride to phthalic acid, or if it should be desired to increase the ultimate recovery of phthalic acid, the gaseous reaction product may be cooled below the dew point whereby water also condenses and reacts with the anhydride to form phthalic acid. The phthalic anhydride frost point varies with the phthalic anhydride content of the gaseous mixture, which in turn is a function of other process variables such as air to naphthalene ratio and the catalyst temperature, which indirectly determines the quantity of oxidation degeneration products as water and maleic anhydride. Likewise, the water dew point is a function of these variables and of the humidity of the original primary and secondary air. Determination of the phthalic anhydride frost point and the water dew points are best conducted experimentally and are well within the capacity of those skilled in the art.

The phthalic anhydride condenser is of the traditional "hay barn" type wherein the reacted gas stream deposits crystals of phthalic anhydride on the walls of a large empty tank or "barn" in the form of long needles or "hay," and from which phthalic anhydride is removed either manually, by indirect heating with hot oil, or by direct flushing with molten phthalic anhydride. Alternatively, fin-tube condensers, scraped wall condensers, or cyclones may be utilized rather than hay barns. Were it desired to recover both phthalic and maleic anhydride the product recover may be conducted in two stages, the first being a condensation at a temperature of about 50 to 80° C. to crystallize phthalic anhydride, and the second being a water or hydrocarbon scrub to recover vapors of maleic anhydride. Scrubbing is desirably employed where it is required to recover and recycle the bromine.

Phthalic anhydride is recovered from the hay barn in high yields with the concurrent production of less than 3% of by-products such as maleic anhydride. Only a very minor amount of the feedstock burns completely to $CO_2$ and water. Subsequent purification of the recovered solid phthalic and/or maleic anhydride may be accomplished by such means as distillation, distillation in the presence of concentrated sulfuric acid, sublimation, solvent extraction with benzene or xylene, or recrystallization from a non-aqueous solvent such as carbon tetrachloride.

*Example II*

For the catalytic vapor phase oxidation of benzene to produce about 1500 pounds per day of maleic anhydride, the reaction may be conducted in a fluidized bed system similar to one of the reactors described in Becker Patent 2,373,008. Aromatic feedstocks such as benzene are very conveniently oxidized in fluidized reactor systems whereby the catalyst bed temperature is regulated within very narrow limits by removing heat of reaction from the bed with steam-generating tubes to control the bed temperature and to completely eliminate hot-spots. The reactor itself is a cylindrical vessel having an air-feed inlet grid at the bottom and a product outlet at the top, and vessel being about 3 feet in diameter and about 6 to 10 feet high. The reactor is provided with a cone-shaped bottom the sides of which are relatively steep (i.e., about a 60 degree slope) so that the stream which is introduced at the base of the cone-shaped bottom will sweep any catalyst particles therefrom and prevent substantial catalyst deposition. About 100 to 200 pounds of finely divided catalyst is contained in the reactor, the exact quantity depending on the contact time to be employed. Around the periphery of the reactor are substantially vertical steam-generating tubes which extend through the top and bottom reactor heads to an upper steam-disengaging header and a lower header connected to a mud drum. A large-diameter tube located external to the reactor connects the steam-disengaging header with the mud drum and provides a hot water recirculation system. During operation, cold water is added to the mud drum and the generated steam is withdrawn from the disengaging drum.

The reactor is provided with two serially-connected Buell cyclones located in the upper portion, each having a dipleg extending to within one foot of the air-feed inlet at the center of the bottom cone. The cyclones serve to separate entrained catalyst particles from the exiting gas stream. Each dipleg is plugged at the bottom by a weighted flapper valve to prevent backflow of gases.

The catalyst is vanadium oxide on alumina and is in the form of spray-dried microspheres having a particle size of about 10 to 100 microns. For the preparation of the catalyst, an ammonium metavanadate solution is combined with an alumina sol and the mixture spray-dried to form microspheres which are calcined at 500° C. before use.

For the oxidation, a gas mixture having a proportional composition of 30 mols of air, 1 mol of benzene, and 0.01 mol of ethylene dibromide is prepared and is preheated in an external furnace to a temperature in the range of about 200–300° C., the actual preheat temperature being selected to provide about a 350° C. reactor temperature. The mixture is then passed to the oxidation reactor at a flowrate of about 25,000 cubic yards per hour and a pressure of about 1.2 atmospheres absolute. The contact time in the reactor is about 1 second, after which the product gas stream leaves through the cyclones.

The product gas stream is then cooled and scrubbed simultaneously in a water scrubber at 50° C. to recover the maleic anhydride as maleic acid. Maleic acid is obtained by evaporating the water solution. By dehydration at 200° C., maleic acid is reconverted to the anhydride.

*Example III*

A 98% pure orthoxylene fraction is oxidized to phthalic anhydride in a fluidized catalyst system employing 10–100 micron size fused vanadium oxide microspheres both as the catalyst and as the source of oxygen. The catalyst is regenerated with air in a separate vessel. This procedure has the advantage that the product gas stream is substantially free from non-condensible oxygen or nitrogen, thus permitting the ready recovery of phthalic anhydride.

A special reactor system is required to permit oxidation of orthoxylene by reduction of $V_2O_5$ to $V_2O_3$ in one vessel and to allow regeneration of the catalyst, i.e. oxidation of $V_2O_3$ to $V_2O_5$ with air, in another. A system suitable for the conversion of 2000 lbs./day of orthoxylene comprises a cylindrical regenerator 3 feet in diameter and 6 feet high, provided with flat air-inlet grid across the bottom and two serially-connected cyclones at the top to separate entrained catalyst from the exhausted air. A 2 inch I.D. catalyst-withdrawal standpipe protrudes thru the grid and descends vertically downward outside the regenerator thru a flow-control slide valve for two feet, after which it joins the orthoxylene inlet line. Extending from this juncture to a cyclone separator located outside and above the regenerator is a gradually-curving twelve-foot by one inch I.D. pipe which functions as a transfer line reactor. The cyclone at the top of the pipe has a dipleg extending into the regenerator and terminating about 6 inches from the grid to return the spent catalyst. The dipleg is provided with a weighted flapper valve which remains closed until the static head of catalyst in the dipleg overcomes the valve weight.

In operation, 83.5 pounds per hour of orthoxylene containing dissolved therein 0.2 weight percent ethylene dibromide is vaporized and conducted through the inlet pipe into the transfer line reactor. There it meets a descending stream of fluidized vanadium pentoxide catalyst which is leaving the regenerator through the catalyst-withdrawal standpipe at a rate controlled by the slide valve. This catalyst stream is at a temperature of about 590° C. and flows at a rate of about 430 pounds per hour. Upon contacting the orthoxylene in the transfer line reactor, the vanadium pentoxide oxidizes the orthoxylene to phthalic anhydride and water, while the vanadium is reduced to the trioxide. The average transfer line temperature is about 400° C. and the residence time is about one second. Both the catalyst and vapors ascend inside the transfer line. An inert carrier gas, e.g. nitrogen or steam, may be used to improve catalyst flow. At the top of the transfer line, the catalyst is separated from the vapor stream by the cyclone and is returned to the regenerator via the dipleg. At the same time, the phthalic anhydride-water vapor stream is conducted to a product recovery section which is desirably a benzene or water scrub.

The catalyst in the regenerator is re-oxidized with air at a temperature of about 590° C. An inventory of about 200 pounds of catalyst is maintained in the regenerator. Air admitted thru the bottom grid reconverts vanadium from the trioxide of the pentoxide and simultaneously burns off any carbonaceous deposits caused by overoxidation of the o-xylene. The spent regeneration air is stripped of its entrained catalyst by the cyclones located at the top of the regenerator and then is exhausted to the atmosphere. After regeneration, the $V_2O_5$ catalyst is ready for another oxidation cycle.

Having described the invention, what is claimed is:

1. A process for the catalytic vapor phase oxidation of benzene to maleic anhydride which comprises reacting vaporized benzene with oxygen in the presence of a metal oxide oxidation catalyst, said metal comprising a member of groups V–b and VI–b of the periodic table of elements, and in the presence of a small promotional amount of a volatile bromine compound free from metallic constituents.

2. Process of claim 1 wherein said metal oxide is molybdenum oxide.

3. Process of claim 1 wherein said metal oxide is vanadium oxide.

4. A process for the catalytic vapor phase oxidation of naphthalene to phthalic anhydride which comprises reacting vaporized naphthalene with oxygen in the presence of a metal oxide oxidation catalyst, said metal comprising a member of groups V–b and VI–b of the periodic table of elements, and in the presence of a small promotional amount of a volatile bromine compound free from metallic constituents.

5. Process of claim 4 wherein said metal oxide is molybdenum oxide.

6. Process of claim 4 wherein said metal oxide is vanadium oxide.

7. A process for the catalytic vapor phase oxidation of orthoxylene to phthalic anhydride which comprises reacting vaporized orthoxylene with oxygen in the presence of a metal oxide oxidation catalyst, said metal comprising a member of groups V–b and VI–b of the periodic table of elements, and in the presence of a small promotional amount of a volatile bromine compound free from metallic constituents.

8. Process of claim 7 wherein said metal oxide is molybdenum oxide.

9. Process of claim 7 wherein said metal oxide is vanadium oxide.

10. In a process for the catalytic vapor phase oxidation of an aromatic hydrocarbon to a dicarboxylic acid anhydride wherein the vaporized hydrocarbon is reacted with oxygen in the presence of a metal oxide oxidation catalyst, said metal comprising a member of groups V–b and VI–b of the periodic table of elements, the improvement which comprises effecting said reaction in the presence of a small promotional amount of a volatile bromine compound free from metallic constituents.

References Cited in the file of this patent

UNITED STATES PATENTS

| | | |
|---|---|---|
| 1,909,355 | Jaeger | May 16, 1933 |
| 2,270,779 | Berl | Jan. 20, 1942 |
| 2,415,800 | Rust et al. | Feb. 11, 1947 |
| 2,643,269 | Augustine | June 23, 1953 |
| 2,833,816 | Saffer | May 6, 1958 |